Feb. 13, 1934.  V. GIDEON  1,947,041

TAB APPLYING MACHINE

Filed Oct. 5, 1929   7 Sheets-Sheet 1

Feb. 13, 1934.　　　V. GIDEON　　　1,947,041

TAB APPLYING MACHINE

Filed Oct. 5, 1929　　　7 Sheets-Sheet 4

Inventor
Victor Gideon
By Charles O'Neill
Attys.

Patented Feb. 13, 1934

1,947,041

UNITED STATES PATENT OFFICE 1,947,041

TAB APPLYING MACHINE

Victor Gideon, Chicago, Ill., assignor to Wilson-Jones Company, a corporation of Massachusetts Application October 5, 1929. Serial No. 397,577

8 Claims. (Cl. 93—1)

This invention relates to a tab fluxing machine. In the past, it has been customary to flux celluloid tabs on sheets by machines which always required a sufficient pause in its operation for the fluxing to take place. Consequently, a great deal of time was lost in the use of such machines.

It is an object of this invention to overcome such delays as have heretofore occurred in fluxing machines and, to this end, an automatic machine has been provided, which involves a rotatable turret having a plurality of fluxing means thereon and which rotates intermittently and brings a different fluxing means into position before the operator at regular intervals. As soon as a sheet is fluxed, it will travel the greater part of a circle, during which time it can be properly heated and fluxed before it is discharged and in the meantime other fluxing means can be charged with a tab and sheet. It is, therefore, unnecessary for the operator to wait while a tab is being properly fluxed upon a sheet.

The invention comprises the novel structure and combination of parts hereinafter described and more particularly pointed out and defined in the appended claims.

In the accompanying drawings, which illustrate a preferred form of this invention and in which similar reference numerals refer to similar features in the different views.

Figure 1:
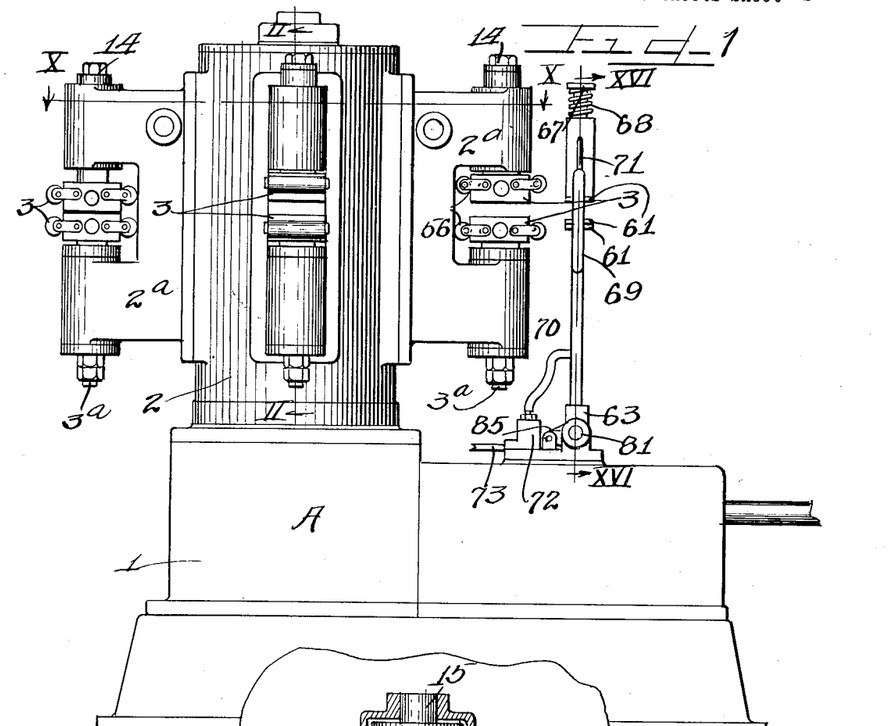
Figure 1 is an elevational view of a fluxing machine embodying this invention.
Figure 3:
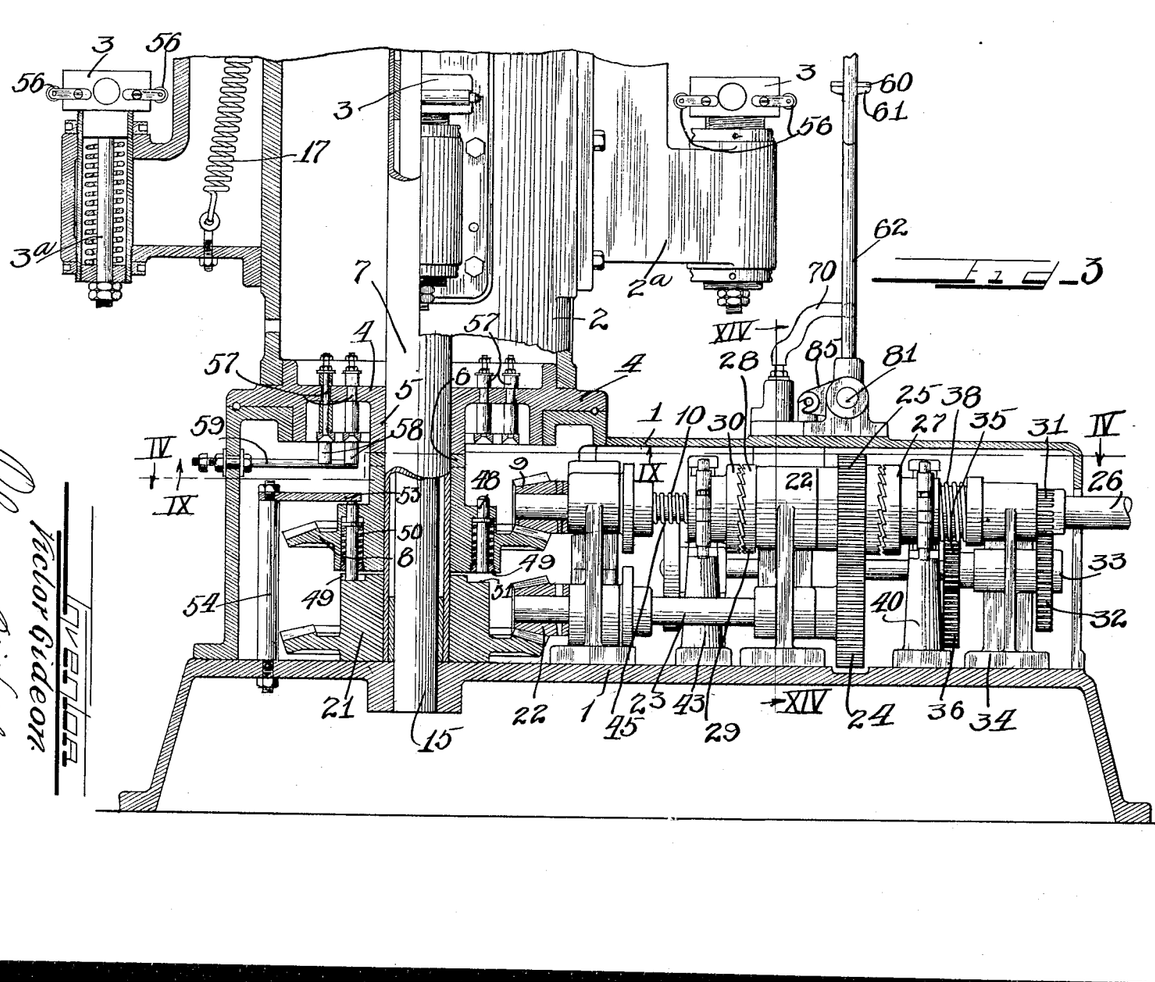
Figure 3 is an enlarged fragmentary sectional view through the machine illustrating the driving mechanism therefor.

Referring now to the drawings, especially Figures 1 and 3, it will be noted that the machine embodying this invention consists of a casing 1 that houses the driving mechanism and a turret 2 that is rotatably mounted upon the housing. The turret carries a plurality of fluxing or sheet gripping devices 3 which are arranged in pairs and equally spaced around the said turret. In the present instance, four pairs of fluxing devices are shown. The turret is intermittently rotated and comes to rest after every quarter turn to allow an operator to place a sheet with a celluloid tab thereon between a pair of fluxing devices. As soon as the sheet is placed between a pair of fluxing devices, the same are brought together to press the sheet and tab together and the turret starts to rotate to bring another set of fluxing devices in position before the operator.

After a pair of fluxing devices containing a sheet has traveled approximately three-quarters of a turn to allow proper time for fluxing, mechanism has been provided for automatically separating the fluxing devices and automatically removing the sheet.

As shown in Figure 3, the turret 2 is attached to a base 4, which is provided with a bearing hub 5 that is journalled upon a hollow vertical spindle 7 and that is provided with a ratchet clutch 6 at its lower end, which engages a ratchet clutch upon the end of a pinion 8 which is also journalled upon the spindle 7. Consequently, rotation imparted to the gear 8 will rotate the turret. The aforementioned gear 8 is driven by a pinion 9 which is mounted upon a shaft 10 that is intermittently driven as will later more fully appear.

Figure 2:
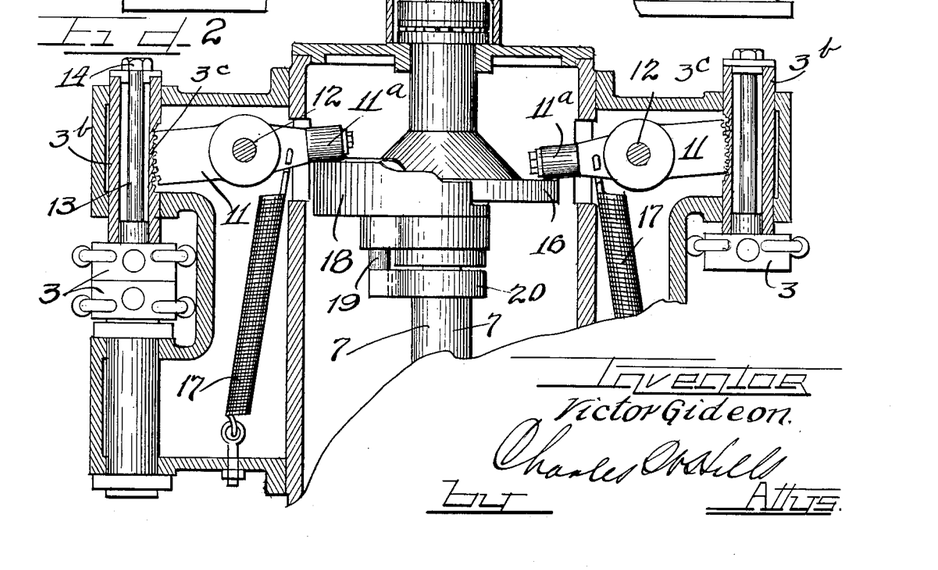
Figure 2 is an enlarged fragmentary sectional view taken upon the line II—II of Figure 1.

Each pair of fluxing devices 3 involves a stationary one and a reciprocating one. In the present instance, the upper fluxing device is shown as reciprocally mounted. It will be noted that each set of fluxing devices is supported upon a radially extending arm 2a on the turret and each arm is provided with a bifurcation in which the fluxing devices are mounted. The lower fluxing devices 3 are suitably supported upon rods 3a that extend through a bifurcated portion. The upper fluxing devices 3 are secured to reciprocating sleeves 3b, as shown in Figure 2. These sleeves are slidably mounted in suitable bearings provided by the arms, and each sleeve has a rack or a plurality of teeth 3c thereon (Figure 2). Suitable rack levers 11 which are pivoted intermediate their ends in the arms as indicated at 12 have their outer ends formed with suitable ratchet teeth for engaging the rack teeth on the sleeves 3b. The manner of attaching the upper fluxing devices 3 to the sleeves 3b preferably consists of rods 13 secured to the fluxing devices and having nuts 14 engaging the outer ends of the sleeves.

Figure 10:
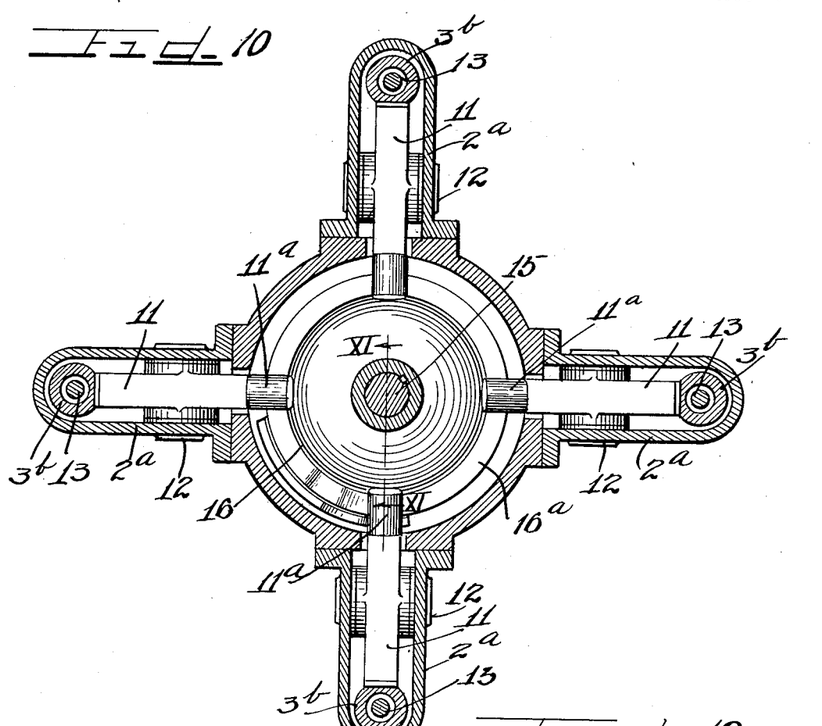
Figure 10 is an enlarged sectional view taken upon the line X—X of Figure 1, looking in the direction of the arrows.

Referring to Figure 10, it will be noted that the arms on the turrets are in the form of narrow U-shaped housings and that the pivot bolts 12 for the rack levers 11 extend therethrough and the hubs on the levers 11 fit nicely between the walls of the housings so that the rack levers cannot readily be displaced in operation.

Figure 12:
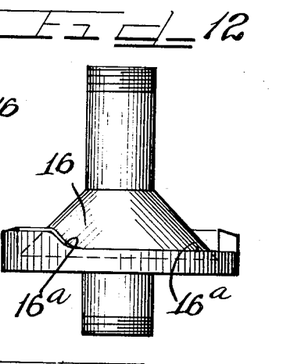
Figure 12 is an elevational view of one of the operating cams in the turret.

A stationary rod 15 extends through the bottom of the casing 1 and through the hollow spindle 7 and forms a support for the upper end of the turret, as shown in Figure 2. A stationary cam 16 is secured upon the upper end of the rod 15, and this cam 16 is provided with a cut-out portion or dwell 16a, as shown in Figures 10 and 12.

The aforementioned rack arms 11 are provided with rollers 11a at their inner ends for riding upon the stationary cam 16, as shown in Figure 10. The inner ends of the rack arms 11 are anchored by means of coil springs 17 to the lower portion of the hollow arms 2a. It will be noted that these springs 17 normally tend to rotate the rack levers 11 for elevating the sleeves 3b, but as long as the rollers 11a are riding upon the elevated portion of the stationary cam 16, the fluxing devices will be held tightly together. However, when the turret has rotated to bring the rollers 11a into the cut-out portion or dwell 16a, the springs 17 will swing the rack levers 11 and elevate the upper fluxing device, so that a sheet may be withdrawn or inserted. In referring to Figure 10, the right hand rack lever 11 is in discharging position and is in contact with the dwell of the stationary cam 16, and the same will remain in said dwell for a quarter turn until the fluxing devices rotate into charging position. When the fluxing devices have rotated to the charging position where the operator sits and feeds in the sheets and celluloid tabs which are folded over the edge of the sheet, the turret is temporarily arrested in its rotation. As soon as the operator has inserted a new sheet between a pair of fluxing devices, mechanism is set in motion for bringing the two fluxing devices together. This mechanism consists of a cam 18 (Figs. 11 and 13), which is rotatably mounted upon the hub 15a of the cam 16, and is connected by a pin 19 with a disc 20 secured to the upper end of the aforementioned hollow spindle 7. Consequently, if the spindle 7 is rotated, the cam 18 will rotate therewith.

Figure 7:
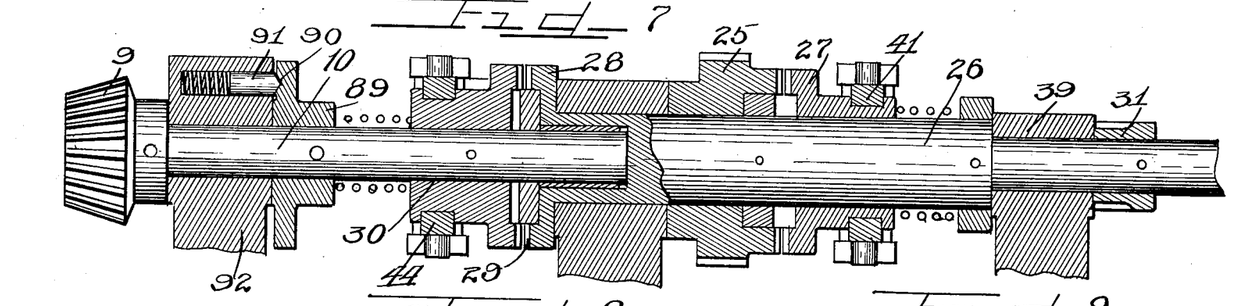
Figure 7 is an enlarged sectional view taken upon the line VII—VII of Figure 4.

It will be noted that the cam 18 has an inclined stepped portion 18a which is adapted to ride under the rollers 11a on the rack arms 11 for lowering the upper fluxing device for gripping a sheet between the two fluxing devices. Mechanism has been provided for rotating the spindle 7 in a direction reverse to the rotation of the turret, in order to operate the fluxing devices as soon as a sheet is inserted therebetween during the pause that occurs during the rotation of the turret. Mechanism has also been provided for returning the cam 18 to its initial position shortly after each reverse rotation thereof. To this end, a gear 21 is secured upon the lower end of the sleeve 7, and this gear is adapted to be periodically driven by a beveled pinion 22 secured upon a shaft 23, which is suitably journalled in the framework in the casing 1. The shaft 23 carries a spur gear 24 that meshes with a spur gear 25 secured upon a driving shaft 26 by means of a clutch 27. The shaft 26 is provided with a bearing socket in its forward end, as shown in Figure 7, for receiving the end of the aforementioned shaft 10, and this end of the shaft 26 is provided with a flange 28 having a ratchet clutch face 29. It will be noted that the clutch 27 is in the form of a ratchet clutch that cooperates with the ratchet clutch on the gear 25. Mechanism has been provided for periodically operating the clutch 27 that cooperates with the gear 25 and a clutch member 30 that is slidably secured upon the shaft 10 for cooperating with the clutch face 29 on the shaft 26, whereby the shafts 10 and 26 are directly coupled together for a direct drive. Means are provided for periodically operating the clutch members 27 and 30 on the driving shaft 26, as will be presently explained.

The driving shaft 26 carries a small spur gear 31 that meshes with a spur gear 32 (Fig. 4) secured upon intermediate shaft 33 which is journalled in the hub 34 of a suitable bearing bracket secured to the bottom of the casing. The inner end of the shaft 33 carries a spur gear 35 that meshes with a large spur gear 36 secured upon a control shaft 37 which is journalled in suitable bracket secured in the casing. The end of the shaft 26 within the aforementioned casing 1 is journalled in a suitable bearing bracket 39, and a coil spring 38 is positioned between the bracket 39 and the clutch member 27 for normally urging the clutch member into engagement with the gear 25.

Figure 4:
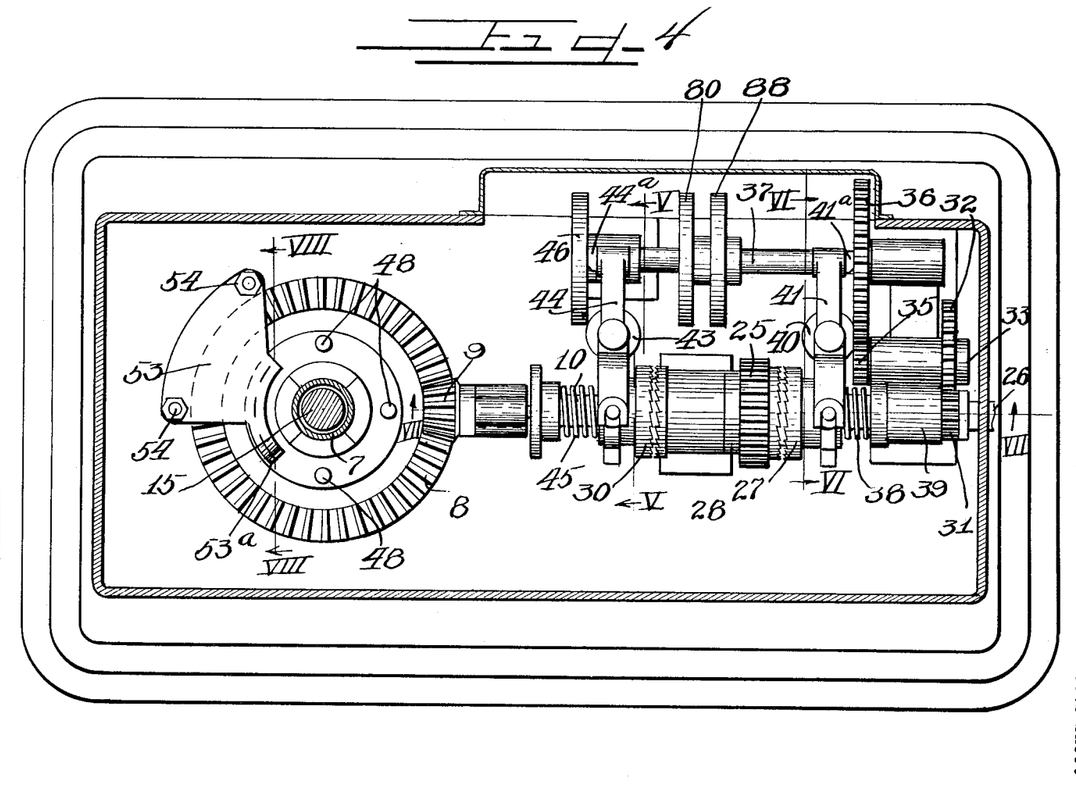
Figure 4 is an enlarged sectional plan view taken upon the line IV—IV of Figure 3.
Figure 6:
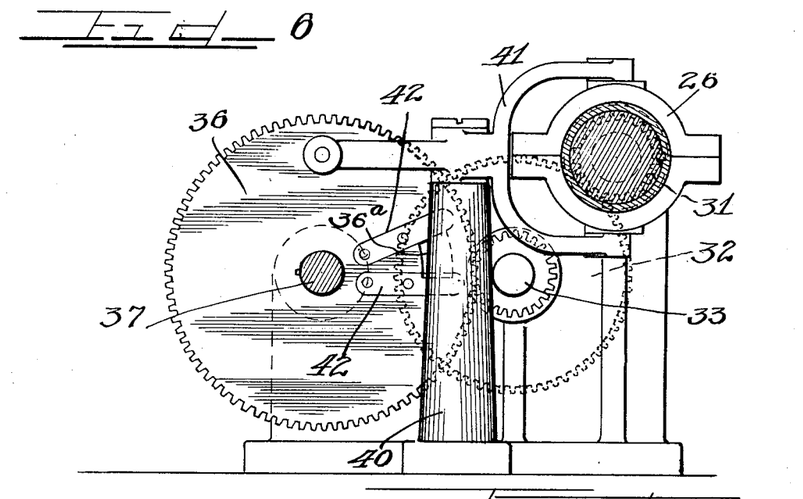
Figure 6 is an enlarged sectional view taken upon the line VI—VI of Figure 4, looking in the direction of the arrows.

In referring to Figures 4 and 6, it will be noted that a suitable pedestal 40 extends upwardly from the bottom of the casing and a yoke lever 41 is pivoted intermediate its ends to the top of the pedestal 40 and engages the aforementioned ratchet clutch 27. The free end of the lever 41 is provided with a shoe 41a that projects against the face of the gear 36, as best shown in Figure 4. As long as the shoe 41a rides over the surface of the gear 36, the clutch 27 will be held in its inoperative position with the spring 38 under compression. The gear 36 is, however, provided with a recess or opening 36a bounded by a pair of wear plates 42 which are countersunk in the face of the gear, with the result that, as the gear is rotated and the opening 36a moves into registry with the shoe 41a of the yoke lever 41, the shoe 41a will enter the opening, due to the pressure of the spring 38, with the result that the clutch member 27 will be thrown into engagement with the gear 25. It will, of course, be understood that the clutch member 27 is keyed upon the shaft and its engagement with the gear 25 will secure said gear for rotation with the shaft 26.

The rotation of the gear 25 with the shaft 26 will operate the aforementioned gear 24 and the shaft 23, and the beveled pinion 22 on the shaft 23 will give a partial rotation to the spindle 7 for rotating the cam 18 under the rack arm 11 and bringing together the fluxing devices that have been charged with a sheet and celluloid tab. As soon as the spindle 7 has been rotated the proper distance to elevate rack lever 11, the gear 36 will have rotated a sufficient distance to remove the opening 36a from registry with the lever 41 for withdrawing the clutch 27 from the gear 25 and stopping the rotation of the shaft 23.

A second pedestal 43 extends from the face of the housing, as shown in Figures 4 and 6, and this second pedestal 43 has another yoke lever 44 pivoted thereon intermediate its ends. This second yoke lever 44 engages the clutch member 30 which is yieldably held in engagement with the shaft 26 by means of a coil spring 45.

Figure 5:
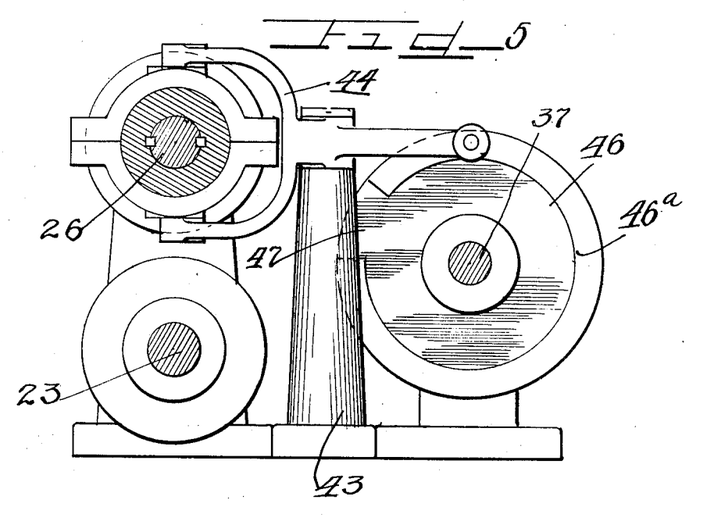
Figure 5 is an enlarged sectional view taken upon the line V—V of Figure 4, looking in the direction of the arrows.

The free end of the yoke lever 44 is provided with a shoe 44a which normally rides against the surface of a disk 46 secured upon the aforementioned shaft 37. In referring to Figure 5, it will be noted that the disk 46 has a flange or rim 46a against which the shoe 44a is normally pressed by the spring 45. This flange 46a has a cut-out portion or dwell as indicated at 47, for the shoe to enter when the disk has been rotated to bring the cut-out portion into registry with said shoe, with the result that the spring 45 can press the clutch member 30 into engagement with the clutch 29 on the shaft 26 and effect a direct drive between the shaft 26 and the shaft 10 for rotating the gear wheel that rotates the turret 2.

As long as the shoe 44a is located in the dwell or cut-out portion 47 of the flange 46a, the turret is being rotated, and this dwell is of sufficient extent to impart a quarter of a revolution to the turret. As soon as the shoe 44a rides out of the dwell 47 and rides upon the raised portion of the flange 46a, the turret is standing still for the purpose of allowing the operator to insert a new sheet with a tab folded thereon and to allow the discharge mechanism to remove a tabbed sheet, as will later more fully appear.

The mechanism is so timed that the clutch 27 will be thrown into engagement with the gear 25 before the disk 46 has completed another revolution so that the hollow spindle 7 may be rotated in a reverse direction for rotating the cam 18 for bringing the fluxing devices together and pressing the sheet and top therebetween that has been inserted by the operator while the turret is standing still. As soon as the cam 18 has rotated a sufficient distance to elevate the rack lever 11 of the charged fluxing devices, the recess 36a will of course pass out of registry with the shoe 41a and the clutch 27 will be thrown out of engagement with the gear 25. After each rotation or oscillation of the cam shaft 7, it must be rotated back to its initial position as will now be explained.

In referring to Figure 3, it will be noted that the turret is driven toward the left by the gear 8 and the cam shaft 7 is driven to the right. The return of the cam shaft 7 to initial position is accomplished through the rotation of the gear 8, which is provided with a plurality of yieldably retained dowel pins 48. In the present instance, there are four dowel pins which are equally spaced at intervals of 90°. These dowel pins extend through the gear and are adapted to project beyond the sides thereof. These dowel pins are mounted in suitable sockets extending inwardly from the bottom of the gear and the upper portions of the sockets have restricted openings through which the upper portions of the pins extend. The sockets are closed at their lower ends by suitable apertured plugs 49 and suitable coil springs 50 surround the dowel pins and are confined by the plugs 49 and the tops of the sockets. These springs normally tend to project the dowel pins in an upward direction so that they cannot project beyond the lower side of the gear. It will be noted that the upper gear 8 is closely adjacent the lower gear 21 and this lower gear 21 is provided with a rabbeted edge 51 in which a stop block 52 is mounted, as shown in Figure 8.

Figure 8:
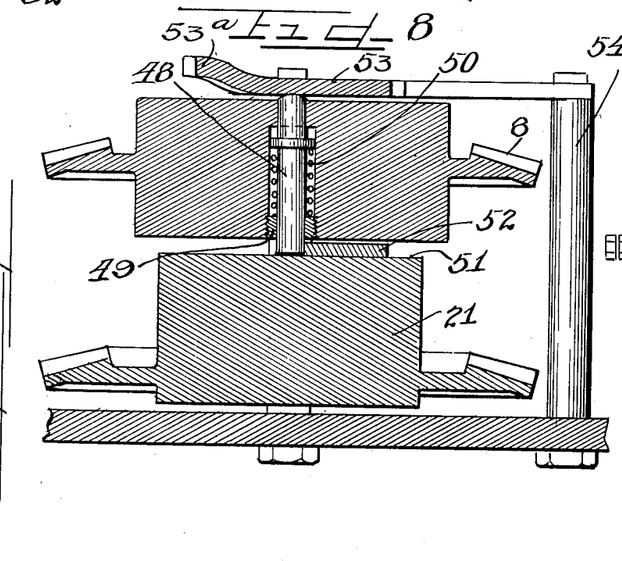
Figure 8 is an enlarged sectional view taken upon the line VIII—VIII of Figure 4.

A suitable shield 53 which is attached to posts 54 extending upwardly from the floor of the casing is positioned at a predetermined location over the gear 8 for engaging the dowel pins 49 as they pass thereunder and forcing the same downwardly as shown in Figures 3 and 8. It will be noted that the shield 53 is upwardly deflected at one end, as indicated at 53a, to allow the dowel pins to pass thereunder and be forced downwardly. When the gear 21 has been rotated as heretofore explained, the block 52 will be rotated into the proper position, and, when the gear 8 is rotated again, one of the dowel pins 48 is rotated under the shield 53, and its lower end will engage the abutment block 52 upon the rabbeted edge of gear 51, and return the gear 21 to its initial position, at which point the dowel pin 48 passes out from under the shield and releases the gear 21, so that the same will always be brought back to the same initial position. When the gear 8 has made another quarter of a rotation, another dowel pin 48 will have been rotated into position to pass under the shield 53 and engage the same abutment 52 upon the gear 21 after the latter has been actuated again for operating an upper fluxing member, and this cycle of operation is continually repeated.

Figures 11, 13:
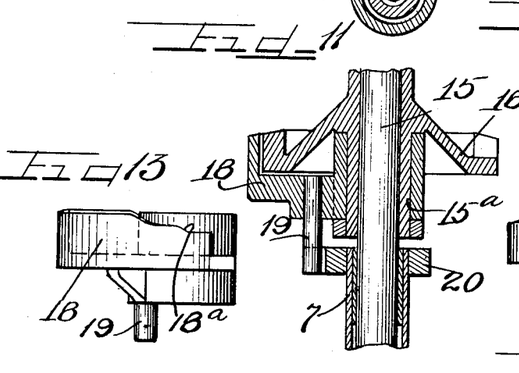
Figure 11 is an enlarged fragmentary sectional view taken upon the line XI—XI of Figure 10.
Figure 13 is an elevational view of a second cam housed within the turret.

In referring to Figure 11, it will be noted that the raised portion of the rotatable cam 18 is of the same elevation as the raised portion of the cam 16. It will, therefore, be evident that the rollers 11a on the rack levers 11 can readily ride from the surface of the cam 18 onto the upper surface of the stationary cam 16 and still maintain the fluxing members in contacting relation.

Figure 9:
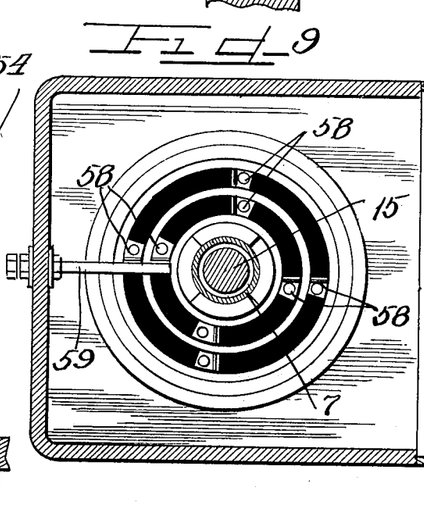
Figure 9 is an enlarged sectional view taken upon the line IX—IX of Figure 3.
Figure 17:
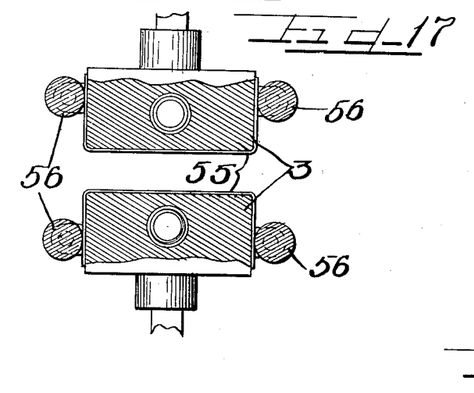
Figure 17 is an enlarged sectional view through the fluxing means.

The aforementioned fluxing devices 3 are preferably covered with some suitable material 55 which extends around the sides thereof and which is adapted to be secured by suitable eccentrics 56 secured to the periphery thereof, as shown in Figure 17. It is also desirable that these fluxing devices should be heated for the purpose of more readily fluxing the celluloid tops to the sheet and in the present embodiment of the invention, electrical means are shown for heating the fluxing members. In referring to Figure 3, it will be noted that the turret carries four sets of electrical posts 57 from which suitable wires extend to the different fluxing members. These electrical posts 57 are in contact with conductors or wiping elements 58, best shown in Figures 3 and 9, and an electrical conductor 59 which supports the wiping contacts and which extends into the stationary casing in the path of rotation of the contact members 58, so that the electrical circuit will be completed whenever a set of posts 57 are in connection with the wiping elements 58. It will be noted that the posts 57 rotate with the turret and that the conductor 59 and wiping elements are stationary, so that each set of fluxing members is electrically heated at a predetermined point in its path of travel, and this point preferably occurs directly after the sheets have been inserted between a pair of fluxing members.

Figure 16:
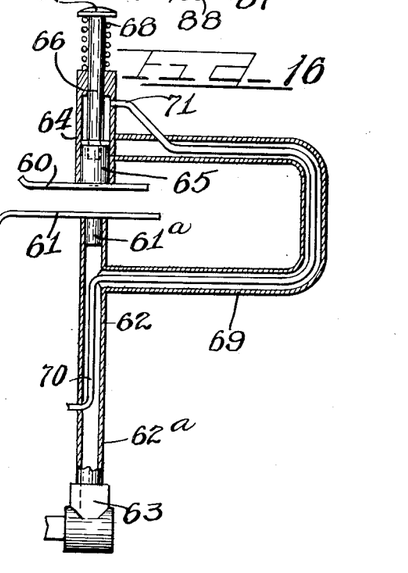
Figure 16 is a sectional view taken upon the line XVI—XVI of Figure 1.

After a sheet with a tab thereon has been inserted between a pair of fluxing members, the turret will be intermittently revolved until the inserted sheet has made three quarters of a revolution, at which point the sheet is removed from its position between the fluxing members. It might be mentioned that the fluxing members are separated when the rack lever 11 thereof reaches the dwell 16a in the stationary cam 16, allowing the spring 17 to operate the rack lever 11, as shown upon the right hand side of Figure 2. When the turret has passed three quarters of a revolution from the starting point, the fluxed sheet will pass between a pair of plates 60 and 61 which are carried by a swingable lever 62, as shown more clearly in Figure 16. This lever consists of a lower hollow tubular portion 62a which fits in a socket member 63. The plate 61 is provided with a stud 61a that fits in the upper end of the portion 62a. The upper portion of the lever 62 consists of an air or fluid cylinder 64 and the plate 60 is provided with a piston 65 that fits in the fluid cylinder 64. This piston is provided with a rod 66 that extends through the upper end of the fluid cylinder and is provided with a head 67 for confining a coil spring 68 which abuts the top of the cylinder and is normally effective for elevating the plate 60. The upper and lower portions of the lever 62 are connected by a U-shaped tubular member 69 which communicates with the lower interior portion of the tube 62 and is welded or secured to the outside of the fluid cylinder 64. An air or fluid supply pipe 70 extends into the lower section of the lever 62 and through the U-shaped tubular connection 69 from which it emerges and enters the fluid cylinder 64, as indicated at 71.

Figure 14:
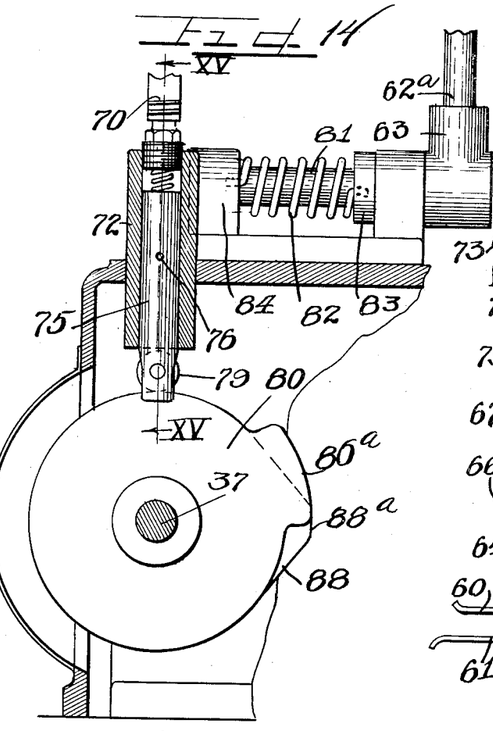
Figure 14 is an enlarged sectional view taken upon the line XIV—XIV of Figure 3.
Figure 15:
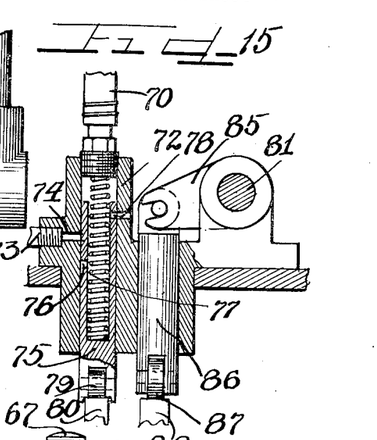
Figure 15 is an enlarged sectional view taken upon the line XV—XV of Figure 14.

The fluid supply pipe 70 enters a valve chamber 72, as shown in Figures 1, 14 and 15. The fluid enters the valve chamber by means of a conduit 73 and a port 74 in the wall of the valve chamber. Within the valve chamber, there is a hollow valve 75 having a port 76 in its wall for registry with the port 74 for the admission of fluid into the valve chamber. A coil spring 77 is normally confined in the hollow valve 75 and abuts the end of the fluid supply pipe 70, for the purpose of sliding the valve 75 for bringing the two ports 74 and 76 out of registry and shutting off the fluid supply. When the valve 75 is in its inoperative position, as shown in Figure 15, a port 78 in its wall is brought into registry with a similar port in the wall of the valve housing for the escape of the fluid. The lower end of the valve 75 carries a roller 79 in a bifurcation thereof, and this roller contacts with a cam 80 mounted on the aforementioned shaft 37. The cam 80 is provided with a projecting lobe 80a, which is adapted for engaging the roller 79 and elevating the valve 75 for bringing the ports 74 and 76 into registry for supplying the fluid to the supply pipe 70 and the cylinder 64. It might be mentioned that this fluid is preferably in the form of air or some gaseous substance. As the fluid enters the cylinder 64, it will force the piston 65 downwardly and pinch the sheets between the plates 60 and 61. As soon as the fluxed sheet is gripped between the two plates 60 and 61, the lever 62 is swung upon its pivot shaft 81 in order to deposit the fluxed sheet in a pile or suitable receptacle. In referring to Figure 14, it will be noted that a coil spring 82 surrounds the pivot shaft 81 and the ends of this coil spring are anchored to suitable bearing brackets 83 and 84, secured to the casing. This coil spring 82 is normally effective for elevating the lever 62 after a sheet has been deposited in the receptacle. The shaft 81 has a crank arm 85 affixed thereto, as shown more clearly in Figure 15, and this crank arm 85 is connected to a plunger 86 which is slidably mounted in a bore in an extension of the valve housing 72. This plunger 86 carries a roller 87 at its lower end which engages a cam 88, which is mounted upon the shaft 37, as shown in Figures 4 and 14. The cam 88 which also has a lobe 88a is designed to operate the plunger 86 and rock the shaft 81 as soon as the fluxed sheet is gripped between the two gripping plates 60 and 61 on the lever 62, for the purpose of swinging the lever to discharge the fluxed sheet upon a pile or into a receptacle. Of course, as soon as the raised portions on the cams 80 and 88 have passed the valve 75 and plunger 86, the spring 82 will spring the lever 62 to a vertical position for gripping the sheet of the next fluxing members when the same are rotated and come to rest at the discharging point.

As before related, this machine is so designed that the turret is rotated a quadrant at a time through the direct connection of the shafts 26 and 10, as shown in Figure 7, and in order that the turret may properly come to rest after each quarter's rotation, the shaft 10 is provided with a collar 89 having a notch 90 which is adapted to be engaged by a spring-impelled detent 91 which is mounted in the bearing 92 for the front end of the shaft, as shown in Figure 7. This construction will prevent the shaft from lagging or creeping ahead, so that the fluxing devices will always be brought into proper relation with the discharging lever 62 when the turret momentarily comes to rest at each quarter revolution.

In the operation of this machine, for the purpose of fluxing the celluloid tab upon a sheet, the operator will take a position in front of the machine as designated by the letter A in Figure 1. Now assuming that the machine is set in motion and a pair of fluxing elements have come to rest in front of the position A, the operator will take a sheet and a celluloid tab and apply the upper fluxing fluid or glue to the tab and fold it over the edge of the sheet and insert the sheet between the fluxing elements, which will be separated in that position of the turret, due to the fact that the rack lever for the particular fluxing elements is in engagement with the dwell 16a of the cam 16. As soon as the sheet and folded tab thereon has been positioned between the two fluxing members, providing the operator is sufficiently speedy to perform this operation before the rotatable cam 18 performs its function, the operating cam 18 will be rotated for engaging under the roller 11a of the rack lever for the particular fluxing members and cause the upper fluxing member to descend and press the sheet and top between it and the lower fluxing member. As soon as this feature of the operation has been completed, the turret will automatically rotate again and the fluxing elements will be heated by the electrical means aforementioned. When the turret has rotated a quarter of a revolution, it will come to rest again and bring another pair of fluxing members 3 into the charging position where the operator sits, and she will insert another sheet with a tab folded thereover. The machine will then automatically advance the turret another quarter of a revolution, to bring a third set of fluxing elements into position before the operator. The machine is automatic in that all the operator is required to do is to insert the sheets with the tabs thereon between the fluxing elements 3 when the turret comes to rest at each quarter of a revolution. When the fluxing members have received a sheet and have traveled three quarters of a revolution from the charging position A, the sheet will be automatically gripped by the discharge lever 62, as previously explained. It should, however, be understood that after each forward movement of the cam 18 for causing the fluxing members to come together, such cam 18 is returned through the engagement of a dowel pin 48 with the aforementioned block 52 on the gear 21. It is, therefore, apparent that, after the machine has been once started, all its operations are automatic, and all that the operator is required to do is to insert the sheets with the folded tabs thereon between the fluxing members 3 when the same come to the charging position A and are in separated position.

It will be apparent that the foregoing machine saves a great deal of time and labor in applying the celluloid tabs to loose sheets. In view of the fact that the machine is automatic in its operation, the attendant can give her entire time to the insertion of the sheets between the fluxing elements, and a great many more sheets can be tabbed in less time than heretofore.

I am aware that many changes may be made and numerous details of construction may be varied through a wide range without departing from the principles of this invention, and I, therefore, do not purpose limiting the patent granted hereon, otherwise than necessitated by the prior art.

I claim as my invention:

1. In a machine of the class described, a rotatable turret, horizontal sheet gripping devices carried by said turret, means for periodically heating said gripping devices, means for separating said gripping devices for receiving a sheet, and a movable cam for closing said gripping devices upon receiving a sheet, and mechanism for seizing and discharging the sheet at a predetermined point.

2. In a machine of the class described, a rotatable turret, a plurality of sets of gripping devices carried by said turret, a driving member connected to said turret for rotating the same, means for separating each set of gripping devices at a predetermined point in its travel, said turret having a dwell at said predetermined point, an oscillatable cam for operating one of said devices relative to the other, driving mechanism for operating said cam, and a connection between said driving member and mechanism for returning said cam to its initial position.

3. In a machine of the class described, a rotatable turret, a plurality of horizontal sets of sheet gripping and fluxing devices carried by said turret, automatic means for periodically rotating said turret, means for separating a set of said devices at a predetermined point for the insertion of a sheet, means for operating said devices for gripping said sheet while the turret is at rest, means for separating a different pair of said devices at a predetermined point for discharging a sheet, and means for gripping and ejecting said last mentioned sheet.

4. In a machine of the class described, a rotatable turret, a set of sheet gripping and fluxing devices carried by said turret, one of said devices embodying a rack sleeve, a lever pivoted intermediate its ends for engaging said rack sleeve, yielding means connected to the outer end of said lever, a cam for maintaining said lever against the tension of said spring, and a movable cam member for engaging said lever for causing relative movement of said devices.

5. In a machine of the class described, a rotatable turret, a plurality of sets of fluxing devices carried by said turret, means for controlling said fluxing devices comprising a stationary cam and a rotatable cam, driving mechanism for said turret, and a connection between said driving mechanism and said rotatable cam for returning the same after each operation.

6. In a machine of the class described, a rotatable turret, a plurality of pairs of sheet gripping and fluxing devices carried by said turret, means for intermittently rotating said turret, means including a stationary cam and a rotatable cam for controlling said gripping and fluxing devices, a driving mechanism for said rotatable cam, and means for returning said rotatable cam to initial position.

7. In a machine of the class described, a rotatable turret, a plurality of sets of sheet gripping and fluxing devices carried by said turret, means including a lever for controlling each set of fluxing devices, a cam for supporting said lever in operative position, said cam having a dwell, and means for causing said lever to descend into said dwell for separating a pair of fluxing devices, and a rotatable cam adapted for engaging said lever and elevating the same with respect to said dwell.

8. In a machine of the class described, a rotatable turret, a plurality of sets of fluxing devices carried by said turret, means for intermittently rotating said turret and bringing a set of fluxing devices into a predetermined feeding position, means for separating the devices in said position for charging purposes and automatic means for closing said devices while the turret is at rest.

VICTOR GIDEON.